UNITED STATES PATENT OFFICE.

THOMAS G. BLACKLOCK, OF NEW YORK, N. Y., ASSIGNOR TO BLACKLOCK MILLING COMPANY, INCORPORATED, A CORPORATION OF NEW YORK.

PROCESS FOR TREATING CEREAL PRODUCTS.

1,203,174.     Specification of Letters Patent.     Patented Oct. 31, 1916.

No Drawing.     Application filed March 24, 1916. Serial No. 86,384.

*To all whom it may concern:*

Be it known that I, THOMAS G. BLACKLOCK, a citizen of the United States, and a resident of the borough of Brooklyn, city of New York, county of Kings, and State of New York, have invented a new and useful Improvement in Processes for Treating Cereal Products, of which the following is a specification.

This invention relates to the manufacture and treatment of raw cereal products, such as breakfast foods, whole wheat flour, corn meal, etc., which contain elements rendering them subject to deterioration, the object being to avoid the heating and mildewing to which such products are liable and the development of larvæ therein, and the same process may be used in the treatment of flour or cereals made from cotton seed.

In the manufacture of refined wheat products, the epidermal cell layers, the layer therebeneath containing gluten, the germ and albuminoids and the skin between the divisions of the endosperm are rejected. These parts of the wheat, which, for convenience, may be termed the bran constituents, have an important food value, but are liable to spoil, because, particularly, of their oil content, and also have a diastasic action on the endosperm or starchy constituent with which they are associated in whole wheat products.

The aim of the present invention is to treat these bran constituents, in such manner as to preserve them against such deterioration and against the hatching out and development of the eggs and larvæ of the Mediterranean moth, which is the cause of much loss in cereal products. The bran constituents thus treated may be used as a breakfast food, or they may be re-mixed with the endosperm constituent for the production of whole wheat breakfast foods or flours.

The process is also applicable to corn meal, the entirety of which is preferably subjected to the treatment.

Briefly stated, the treatment consists in subjecting the cereal, after grinding, or the selected portion thereof comprising the oil and gluten bearing constituents, to a suitable degree of heat and combining salt therewith in such manner that the salt is caused to adhere to the cereal particles, protecting the same against the causes of deterioration above noted. The purpose of heating the cereal product is to bring out the moisture contained therein, so that the mass is brought into a moist or steaming condition, but without the addition of extraneous moisture, in order that the salt may become partially dissolved, the moisture being re-absorbed into the cereal particles when the latter cool, leaving the salt crystallized thereon. The heating also serves to sterilize the cereal and to kill eggs and larvæ which may be present therein, particularly the eggs and larvæ of the Mediterranean moth. In order to aid in bringing out the moisture of the cereal and to avoid the necessity of using an undesirably high temperature, the heating is performed in a partial vacuum. The temperature, the degree of vacuum, the length of time during which the cereal particles are subjected to these conditions, and the amount of salt added are all permissible of variation. From about one-half to about two per cent. of salt may be employed, and the heating is preferably continued for about eight minutes at a temperature of about 180° F. If the temperature is greater the vacuum may be less, and vice-versa, but I prefer to work with a temperature which does not cook the cereal. The temperature and the length of time during which the cereal is subjected thereto may be sufficient, however, to coagulate a part of the albuminoids of the cereal, which coagulated albuminoids may be separated by screening, for recovery as a valuable by-product.

The process is preferably carried out in a continuous manner by means of the apparatus disclosed in my application of even date herewith, Serial Number 86385. The heating is performed in a closed chamber, which may be heated by a steam jacket, and suitable means are provided for feeding the material thereto at a definite uniform rate and for progressing it through the chamber at even speed. The partial vacuum is maintained in this chamber by exhausting apparatus connected therewith. From the heater the cereal now in a moist or steaming condition is preferably transferred to another part of the apparatus, where it is mixed with the salt, suitable provisions being made for bringing the cereal and salt together in the desired proportions. The product is finally allowed to cool and in so doing becomes dry. The salt then adheres as a crystalline deposit to the cereal particles and will not separate therefrom.

In the manufacture of a wheat breakfast food in accordance with the invention the wheat is ground in an attrition mill, and the product of the grinding passed through a corn shaker sieve, which separates the portions called herein the bran constituents and which are variously known as middlings, or shorts, or ships. This use of the term "middlings," it may be noted, should be distinguished from the other use of the same term to denote an intermediate stage in the milling of the endosperm constituent which goes to make up white flour and other refined wheat products. These bran constituents are then treated as above described, after which they are in readiness for marketing as a breakfast food. Whole wheat products are made in the same way, except that the bran constituents after treatment are re-mixed with the endosperm constituent. In the milling of corn, the corn is ground and the whole meal subjected to the process.

What I claim as new is:

1. The method of treating raw cereal products which are subject to deterioration, which comprises heating the same and combining salt therewith in such manner that the salt adheres to the particles.

2. In the treatment of cereal grains, the steps which comprise grinding the cereal, separating from the ground product the part subject to deterioration, heating such part, and causing salt to adhere to the particles thereof.

3. The method of preparing an uncooked wheat product which comprises heating bran constituents and causing salt to adhere to the particles thereof.

4. The method of manufacturing an uncooked wheat product which comprises grinding the wheat, separating therefrom a part comprising bran constituents, heating the said part, and causing salt to adhere to the particles thereof.

5. The method of manufacturing a whole wheat product, which comprises grinding the wheat, separating the product of the grinding into its constituents of bran and endosperm, heating the bran constituents and causing salt to adhere to the particles thereof, and remixing the bran constituents thus treated with the endosperm constituent.

6. The method of preparing an uncooked wheat product, which comprises heating bran constituents, causing salt to adhere thereto, and mixing the product of this treatment with an endosperm constituent.

7. The method of preserving ground cereal products, which comprises heating the same in such manner as to bring out moisture contained therein, and mixing salt therewith while in this condition so that the salt remains adherent to the cereal particles when the latter cool.

8. The method of preserving a cereal product, which comprises heating the same under a partial vacuum so as to bring out moisture contained in the cereal particles, mixing a suitable proportion of salt therewith while in this condition so that the salt partly dissolves in the moisture of the cereal, and finally allowing the product to cool with the salt adherent to the particles thereof.

9. The method of preserving an uncooked cereal product, which comprises heating the same in a closed chamber without addition of moisture and in such manner as to bring out moisture contained in the cereal particles, and mixing salt therewith while in the steaming condition produced by this treatment.

10. The method of preserving a ground uncooked cereal product which comprises heating the same to a temperature of about 180° F. and mixing from about one-half to about two per cent. of salt therewith while in the steaming condition produced by this treatment.

11. The method of preserving a ground uncooked cereal product which comprises heating the same to a temperature of about 180° F. for about eight minutes, and mixing from about one-half to about two per cent. of salt therewith while in the steaming condition produced by this treatment.

12. The method of treating a raw cereal product which comprises sterilizing the same by heat without cooking and causing salt to adhere to the cereal particles.

13. The method of treating raw cereal products which comprises sterilizing the same and bringing out the moisture therein by means of heat and a partial vacuum, and then supplying salt and mixing the same with the cereal while the latter is in the steaming condition due to its own moisture.

14. The method of treating a raw cereal product which comprises heating the same under a partial vacuum so as to bring out the moisture in the particles and to coagulate albuminoids contained therein, remov ing the coagulated albuminoids, and combining salt with the moist and heated cereal particles.

15. An uncooked cereal product having a preservative deposit of salt adhering to its particles.

16. An uncooked breakfast cereal containing the protein and oil bearing constituents of the grain and having salt crystallized upon its particles.

In witness whereof, I have hereunto set my hand this 22nd day of March, 1916.

THOMAS G. BLACKLOCK.